(12) United States Patent
Knapper (10) Patent No.: US 9,874,884 B2
(45) Date of Patent: Jan. 23, 2018

(54) VALVE BLOCK HAVING A VALVE ASSEMBLY

(71) Applicant: Robert Bosch GmbH, Stuttgart (DE)

(72) Inventor: Steffen Knapper, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 14/515,099

(22) Filed: Oct. 15, 2014

(65) Prior Publication Data

US 2015/0101676 A1 Apr. 16, 2015

(30) Foreign Application Priority Data

Oct. 15, 2013 (DE) .................... 10 2013 220 750

(51) Int. Cl.
*F15B 13/04* (2006.01)
*G05D 16/10* (2006.01)
(Continued)

(52) U.S. Cl.
CPC .......... *G05D 16/106* (2013.01); *F15B 11/165* (2013.01); *F15B 13/0417* (2013.01);
(Continued)

(58) Field of Classification Search
CPC . G05D 16/106; F15B 11/165; F15B 13/0417; F15B 2211/6054; F15B 2211/6051; F15B 2211/3127; F15B 13/0817; F15B 2211/20546; F15B 2211/30535; F15B 2211/7142; F15B 2211/6055; F15B 11/167; F15B 2211/654;
(Continued)

(56) References Cited

U.S. PATENT DOCUMENTS 4,147,178 A * 4/1979 Budzich .............. F15B 11/0445
137/596.1
4,738,103 A * 4/1988 Tha ........................ E02F 9/123
60/427
(Continued)

FOREIGN PATENT DOCUMENTS

DE 10 2006 018 706 A1 10/2007
DE 10 2009 034 616 A1 2/2011
(Continued)

OTHER PUBLICATIONS

Bosch Rexroth AG; Load-sensing control block in mono and sandwich plate design; RE 64276/08.2010 Data sheet; Aug. 2010; 64 Pages; Germany.
(Continued)

*Primary Examiner* — F. Daniel Lopez
*Assistant Examiner* — Dustin T Nguyen
(74) *Attorney, Agent, or Firm* — Maginot, Moore & Beck LLP (57) ABSTRACT

A valve block includes a plurality of control valve disks that form a first block part and a second block part. A supply pressure for the control valve disks of the first block part is limited by a common pressure-limiting valve. The common pressure-limiting valve is arranged such that a prevailing load pressure registered by the control valve disks does not exceed a specific value. The supply pressure for the control valve disks of the second block part is not limited.

15 Claims, 3 Drawing Sheets

(51) Int. Cl.
    *F15B 11/16*     (2006.01)
    *F15B 13/08*     (2006.01)

(52) U.S. Cl.
    CPC .. *F15B 13/0817* (2013.01); *F15B 2211/20546* (2013.01); *F15B 2211/30535* (2013.01); *F15B 2211/3127* (2013.01); *F15B 2211/6051* (2013.01); *F15B 2211/6054* (2013.01); *F15B 2211/6055* (2013.01); *F15B 2211/654* (2013.01); *F15B 2211/7142* (2013.01); *Y10T 137/2544* (2015.04)

(58) Field of Classification Search
    CPC   Y10T 137/2544; E02F 9/2203; E02F 9/2221; E02F 9/2225; E02F 9/2232
    USPC ............. 60/452, 422, 468, 420; 91/446, 448
    See application file for complete search history.

(56) References Cited

U.S. PATENT DOCUMENTS

| | | | | |
|---|---|---|---|---|
| 4,759,183 | A * | 7/1988 | Kreth | E02F 9/2239 60/422 |
| 4,856,278 | A * | 8/1989 | Widmann | E02F 9/2239 60/423 |
| 5,150,574 | A * | 9/1992 | Hirata | E02F 9/2232 60/465 |
| 5,193,342 | A * | 3/1993 | Omberg | E02F 9/2225 60/426 |
| 5,333,449 | A * | 8/1994 | Takahashi | E02F 9/2232 60/427 |
| 5,806,312 | A * | 9/1998 | Kauss | E02F 9/2232 137/596 |
| 6,134,887 | A * | 10/2000 | Bertotti | E02F 9/2225 60/422 |
| 8,281,583 | B2 * | 10/2012 | Kauss | E02F 9/2203 60/422 |
| 9,404,483 | B2 * | 8/2016 | Kauss | F15B 11/161 |
| 2005/0178116 | A1 * | 8/2005 | Olbrich | F15B 11/165 60/420 |

FOREIGN PATENT DOCUMENTS

| | | |
|---|---|---|
| EP | 1 170 510 B1 | 8/2005 |
| EP | 1 497 559 B1 | 12/2005 |
| FR | 2 757 222 A1 | 6/1998 |

OTHER PUBLICATIONS

Sauer Danfoss; PVG 32 Proportional Valves; Technical Information 520L0344; Dec. 2010; 80 Pages; www.sauer-danfoss.com.
German Search Report corresponding to German Application No. 10 2013 220 750.6, dated Jun. 11, 2014; 7 pages.

* cited by examiner

VALVE BLOCK HAVING A VALVE ASSEMBLY

This application claims priority under 35 U.S.C. §119 to patent application no. DE 10 2013 220 750.6, filed on Oct. 15, 2013 in Germany, the disclosure of which is incorporated herein by reference in its entirety.

BACKGROUND

The disclosure proceeds from a valve assembly and a valve block.

Such a hydraulic valve or control assembly is known in the prior art and comprises so-called "load-sensing" control valves having a control piston for directional and speed control. A metering orifice is formed in the control piston. Here a pressure compensator, which keeps the pressure gradient and therefore also the volumetric flow at the respective metering orifice constant, irrespective of the load, is assigned to a particular control valve. For this purpose the pressure is registered upstream and downstream of the metering orifice and signaled to the pressure compensator. Its piston is biased towards a usually open neutral position by a spring, which exerts an ideally constant force. In addition to the spring the load pressure registered downstream of the metering orifice acts in the opening direction of the piston of the pressure compensator. By contrast only the supply pressure registered upstream of the metering orifice and downstream of the pressure compensator acts in the closing direction of the piston of the pressure compensator.

The load pressure is applied by the load occurring at any given time and cannot be influenced by the control valve; the piston of the pressure compensator on the other hand reacts to load pressure changes and is displaced in the opening direction in the event of an increase in the load pressure or in the closing direction in the event of a fall in the load pressure The supply pressure is regulated by the pressure compensator and is always high enough to ensure that the force acting in the closing direction due to the supply pressure is in equilibrium with the force of the spring acting in the opening direction and that of the load pressure. The force of the supply pressure thereby always exceeds the force of the load pressure by the constant amount of spring force, thereby resulting in an always constant pressure gradient and consequently a constant volumetric flow at the metering orifice.

The facility for limiting the supply pressure level in order to safeguard the mechanical equipment on the consumer side is also known. This is achieved by allowing a pressure-limiting valve, provided in a load-sensing line, to relay a distorted reading of the actual load pressure to the pressure compensator, in that at a set maximum pressure the pressure-limiting valve opens a connection to the tank, so that the load pressure signaled cannot exceed a specific level. In order to keep the outflow quantity and overall size of the pressure-limiting valve as small as possible, an orifice, through which only a small volumetric flow is able to flow to the tank, is usually arranged in the load-sensing line between the load pick-up and the pressure-limiting valve. The operating principle of this pressure limiter means that the volumetric flow control to the consumer connection of the control valve can be completely disabled. The volumetric flow set by the control piston is fully reduced, for example, if the consumer is being run in opposition to a high resistance, which would require a supply pressure in excess of the set maximum pressure. In this case the supply pressure in the consumer connection will exceed the value set on the pressure-limiting valve by no more than the spring force. Limiting the pressure through multiple pressure-limiting valves for multiple consumer connections is also known.

Such a solution is disclosed by the Rexroth data sheet RD 64276, issue August 2010. In this a valve disk, in which the pressure compensator and the pressure-limiting valve are also arranged, is provided for each control valve. Here the pressure-limiting valve is provided form one consumer. The use of a separate pressure-limiting valve for each of the various actuating devices of the consumer is also disclosed. Disadvantages with this solution are the large amount of space required and the mechanically elaborate design of the valve disk, which leads to high costs.

The Sauer Danvoss data sheet "Series PVG 32, Proportional Valves" proposes to arrange a pressure-reducing valve in a main oil flow. The pressure-reducing valve used for this purpose is of comparatively large design and is designed for a volumetric flow of 200 l/min, for example. A flow passes through the pressure-reducing valve even when no pressure reduction is to ensue, which leads to high pressure losses. In addition, the large overall space required is extremely disadvantageous.

The object of the disclosure, on the other hand, is to create a cost-effective, compact and energy-efficient valve assembly, which serves to limit a supply pressure for all or some hydraulic consumers. A further object of the disclosure is to create a valve block having such a valve assembly, which is of cost-effective and compact design.

SUMMARY

The object with regard to the valve assembly and with regard to the valve block is achieved according to the features of the disclosure.

Other advantageous developments of the disclosure form the subject matter of further dependent claims.

According to the disclosure a valve assembly is provided with a plurality of control valves. These each have a control piston which serves to control a direction and a speed of a consumer. A metering orifice is formed with the control piston. In addition, a pressure compensator or individual pressure compensator is provided, which is assigned to a particular control valve. A pressure registered upstream and downstream of the metering orifice of a particular control valve is signaled to this compensator. The pressure compensator serves to keep a pressure gradient at the metering orifice substantially constant irrespective of the load. For registering the pressure downstream of each metering orifice a load-sensing flow path is provided.

In addition, the valve assembly comprises a shuttle valve. This connects that load-sensing flow path of the control valves having the highest pressure at any given time to its outlet connection. The shuttle valve therefore has a fluid connection to the load-sensing flow paths in such a way that its outlet connection has a fluid connection to the load-sensing flow path having the highest pressure. For sensing the highest pressure of the load-sensing flow paths the outlet connection can be connected to the variable-capacity pump. A pressure-limiting valve (especially an adjustable one) is advantageously provided downstream of the outlet connection of the shuttle valve. This pressure-limiting valve serves to limit the highest pressure of the load-sensing flow paths at any given time.

This solution has the advantage that one common pressure-limiting valve is simply provided for a plurality of control valves, in order to limit the supply pressure. This saves overall space and reduces the outlay for mechanical devices, thereby reducing costs. With the solution according to the disclosure the inlet connection of the shuttle valve, to which the load-sensing flow path having the highest pressure is connected, is connected to the outlet connection, which advantageously means that the pressure at this outlet connection is limited by the pressure-limiting valve having a fluid connection to the outlet connection, so that the pressure at the inlet connection connected to the outlet connection, and therefore the pressure of the load-sensing flow path having the highest pressure, is also limited.

In a further development of the disclosure at least one further control valve is provided with a control piston as metering orifice and with a pressure compensator assigned to the control valve, the load-sensing flow path of which is connected to a first inlet connection of a further, second shuttle valve. A second inlet connection of the shuttle valve is then connected to an outlet connection of the first shuttle valve. In turn the outlet connection of the second shuttle valve can be connected to the variable-capacity pump for sensing the highest pressure. The pressure-limiting valve is therefore connected to the flow path between the first shuttle valve and the second shuttle valve. The pressure-limiting valve is therefore connected between the outlet connection of the first shuttle valve remote from the pump and the inlet connection of the adjacent, second shuttle valve closer to the pump. On the outlet side the pressure-limiting valve may be connected to the outlet port of the valve assembly. It is advantageous here to limit the supply pressure for hydraulic consumers which are connected to the control valves that are assigned to the first shuttle valve (remote from the pump). In the case of a consumer connected to the further control valve (to which the second shuttle valve, close to the pump, is assigned), on the other hand, the supply pressure is not limited via the pressure-limiting valve. The supply pressure of the consumers remote from the pump is therefore limited to a lower pressure than that of the consumer(s) closer to the pump.

The valve assembly according to the disclosure is preferably used for an agricultural tractor. A number of different mounted implements, which may be quite old, are generally used for a tractor. Such mounted implements often have a resistance to pressure of less than 200 bar. According to the disclosure such mounted implements may be used as consumers remote from the pump and having control valves which are assigned to the first shuttle valve (remote from the pump). Conventional, interchangeable mounted implements having a low maximum supply pressure are therefore intended as consumers remote from the pump. Consumers closer to the pump (steering, front bearings, other consumers fixedly arranged on the tractor, newly developed mounted implements) can then be used at a higher working pressure and can therefore be built correspondingly smaller for the same working forces. In particular, functions intrinsic to the tractor, such as steering, lifting gear or front lifting gear, can therefore be designed for considerably higher pressures, in order to overall space in order to save costs. Individual mounted implements, for example a separate front-end loader, might also be provided as consumers remote from the pump. This can then likewise be operated with a higher supply pressure. Owing to the higher supply pressure, such a front-end loader would then have comparatively smaller hydraulic cylinders, thereby increasing the overall visibility from the tractor and the view of the front-end loader. Besides the size, another advantage of systems having a higher pressure and smaller cylinders is the reduced losses in the lines, since smaller quantities of oil have to be transmitted for the same power output.

A respective shuttle valve is preferably provided for each control valve and therefore for each load-sensing flow path. In a further development these can be connected to one another and to the load-sensing flow paths in such a way that the shuttle valve (first shuttle valve)—to the outlet connection of which the pressure-limiting valve is connected—is provided downstream of the load-sensing flow paths of those control valves in which the supply pressure is to be limited.

The shuttle valves may therefore form a shuttle valve cascade.

A restrictor (drain relief) may advantageously be provided in a fluid connection parallel to the pressure-limiting valve. This restrictor then has a fluid connection to the flow path between the first and second shuttle valve and an outlet.

The pressure downstream of a particular metering orifice is preferably registered by way of a restrictor. A comparatively small volumetric flow thereby flows via the pressure-limiting valve, so that the latter can in turn be of relatively small design.

The pressure compensator advantageously comprises a piston arranged in a spool bore. This piston may be biased in its open, neutral position by a spring force of a spring. In addition to the spring force the pressure registered downstream of the metering orifice may act on its first end face in the opening direction of the piston. In opposition to this, the pressure registered upstream of the metering orifice and downstream of the pressure compensator can act on its second end face and hence in the closing direction. The piston, preferably with its first end face, defines a pressure chamber, in particular a closed chamber, in the spool bore. This chamber is connected to the load-sensing flow path by way of a first port section, proceeding from the first end face and extending approximately in a longitudinal direction or axially, and a second radially adjoining port section therein. The restrictor is formed in one of the port sections, preferably in the radial, second port section. The restrictor therefore fulfils a dual function. It ensures firstly that only a small fluid volumetric flow flows off to the outlet via the load-sensing flow path, and secondly that a movement of the piston of the pressure compensator is damped. The pressure chamber may be the spring chamber of the spring.

According to the disclosure a valve block has a valve assembly according to the disclosure. The valve block comprises a plurality of control valve disks. A control valve with the associated pressure compensator is then formed in each of these disks. An additional pressure-limiting valve disk may be provided for the pressure-limiting valve or it is simply arranged in one of the control valve disks. The valve assembly is extremely easy to expand through as valve block.

In a further development of the disclosure provision is made for a plurality of control valve disks in the valve block. The pressure-limiting valve disk can then be arranged as an intermediate plate between at least two control valve disks forming a first block part and at least one control valve disk forming a second block part. The highest pressure of the load-sensing flow paths of the first block part can then be limited by the pressure-limiting valve. The first block part is therefore a low-pressure block part and the send block part is a high-pressure block part. The block parts can be reduced or expanded simply by removing and adding control valve disk. In addition, the pressure-limiting valve disk can easily be shifted. One or more control valve disks can thereby be easily assigned to the first or the second block part.

The first block part is intended for a limited supply pressure (reduced working pressure) and is therefore intended, in particular, to serve for mounted implements on a tractor. The second block part on the other hand is to be used for a maximum possible supply pressure (maximum working pressure) and is therefore intended to serve for lifting gear functions on the tractor. The first block part is accordingly intended for operating consumers, the supply pressure of which will lie below the maximum possible system pressure. The second block part can then supply consumers with the full supply pressure.

The second block part or the pressure-limiting valve disk is preferably connected to a pump part. Here the pump part may comprise a variable-capacity pump having a pressure regulator. In addition, a further hydraulic pump may be provided in the pump part as control oil pump for the control oil supply of a hydraulic control of the control valves. Alternatively it is feasible for the system to be operated by a constant-capacity pump via a suitable input plate.

The first block part may, in particular, be connected on its side facing away from the pressure-limiting valve disk to an end piece.

In a further development of the disclosure a particular shuttle valve, which is connected by its first inlet connection to the load-sensing flow path of the control valve, is arranged in a particular control valve disk. A particular shuttle valve can then be connected by its second inlet connection to a first connection side of the control valve disk and by its outlet connection to a second connection side of the control valve disk (facing away from the first connection side). The outlet connection and the second inlet connection can therefore be connected together by adjacent shuttle valves of the control disks. The shuttle valves then simply form a shuttle valve cascade.

The pressure-limiting valve disk may comprise a passage extending between its connection sides, which affords a fluid connection between the outlet connection of the shuttle valve of the adjacent control valve disk of the first block part and the adjacent control valve disk of the second block or the pump part. The pressure-limiting valve is then connected to the passage.

The control valve disks can simply be of identical mechanical design.

In a further development of the disclosure the control valve disks and the pressure-limiting valve disk have a common inlet port, a common outlet port, a common control oil inlet port and a common control oil outlet port.

For connecting a consumer a particular control valve disk may in each case have two working connections, which are connected to the control valve via a feed port and a return port respectively.

BRIEF DESCRIPTION OF THE DRAWINGS

Preferred embodiments of the disclosure are explained in more detail below with reference to drawings, of which.

DETAILED DESCRIPTION

Figure 1:
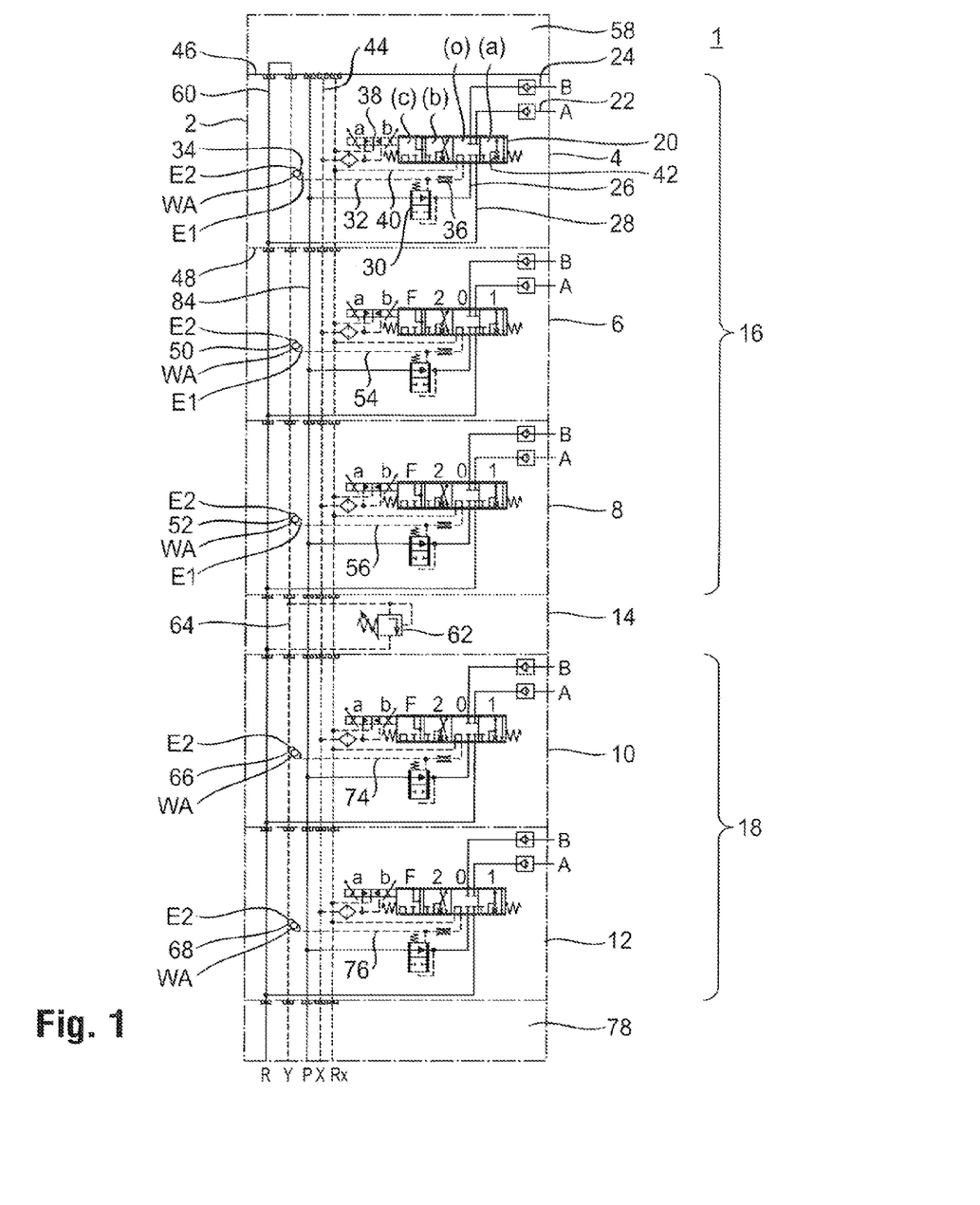
FIG. 1 in a hydraulic circuit diagram shows one embodiment of the valve assembly according to the disclosure, FIG. 2 in a hydraulic circuit diagram shows a pump part for the valve assembly in FIG. 1, FIG. 3 in a hydraulic circuit diagram shows a detail of the valve assembly according to a second exemplary embodiment.

According to FIG. 1 the valve assembly 1 according to the disclosure is represented in the form of a valve block 2. This has a plurality of control valve disks 4, 6, 8, 10 and 12 and a pressure-limiting valve disk 14. The control valve disks 4 to 8 here form a first block part 16 and the control valve disks 10 and 12 form a second block part 18. A consumer can be connected to a particular control valve disk 4 to 12 via working connections A and B. For controlling a speed and direction of a particular consumer a particular control valve disk 4 to 12 comprises a control valve. In FIG. 1, only the control valve 20 of the control valve disk 4 is provided with a reference numeral for the sake of clarity.

Since the control valve disks 4 to 12 are of identical design, the construction of a particular control valve disk 4 to 12 is explained in more detail with reference to the control valve disk 4. The working connection A of the control valve disk 4 is connected to the control valve 20 via a first port 22 and the working connection B is connected to the control valve 20 via a second port 24. Here a particular port 22 or 24 may be used as feed or return port, depending on the direction in which the consumer is being moved. In addition, an inlet port 26 and an outlet port 28 are connected to the control valve 20. A pressure compensator 30 is arranged in the inlet port 26. The load pressure is registered via a load-sensing flow path in the form of a load-sensing port 32 connected to the control valve 20. The load-sensing port 32 is then connected to a first inlet connection E1 of a shuttle valve 34 on the one hand and to the pressure compensator 30 on the other. The load pressure then acts upon a piston of the pressure compensator 30 in the direction of its open, neutral position, in which the spring force of a valve spring also acts on the piston. In the closing direction the piston of the pressure compensator 30 is acted upon by the pressure which is registered between the pressure compensator 30 and the control valve 20. The load pressure is registered by the load-sensing port 32 via a restrictor 36.

A valve spool of the control valve 20 can be actuated by a pilot valve 38. In its neutral position 0 shown in FIG. 1 the valve spool of the control valve 20 is spring-centered by a spring assembly. In the neutral position 0 the load-sensing port 32 is connected to a control fluid outlet port, whilst the other ports 22, 24, 26 and 28 are separated from one another. If the valve spool, starting from its neutral position 0, is displaced towards shift positions a, the control fluid outlet port 40 is separated from the load-sensing port 32. The load-sensing port 32 then has a fluid connection to the second port 24 downstream of a metering orifice 42 of the control valve 20. The first port 22 has a fluid connection to the outlet port 28. If the valve spool of the control valve 20, starting from the neutral position 0, is displaced in the opposite direction from the shift positions a towards shift positions b, the control fluid outlet port 40 is likewise separated from load-sensing port 32. The inlet port 26 is then further connected to the first port 22 and the load-sensing port 32 has a fluid connection to the first port 22 downstream of the metering orifice 42. The second port 24 is connected to the outlet port 28. If the valve spool of the control valve 20, starting from the shift positions b, is displaced further away from its neutral position 0, this passes into safety positions c, in which the ports 22 and 24 have a common fluid connection to the outlet port 28. The load-sensing port 32 and the control fluid outlet port 40 are here again connected to one another, corresponding to the neutral position 0.

The pilot valve 38 is supplied with control fluid via a control fluid inlet port 44 and can deliver control fluid via the control fluid outlet port 40.

A second inlet connection E2 of the shuttle valve 34 is connected to a connection side 46 of the control valve disk 4. An outlet connection WA of the shuttle valve 34, on the other hand, is connected to a connection side 48 of the control valve disk 4 facing away from the connection side 46. A shuttle valve 50 of the adjacent control valve disk 6 is provided in the fluid flow direction away from the outlet connection WA of the shuttle valve 34. The outlet connection WA of the shuttle valve 34 and a second inlet connection E2 of the shuttle valve 50 therefore have a fluid connection. The same applies to a shuttle valve 52 of the present control valve disk 8, which is arranged downstream of the shuttle valves 34 and 50. Its second inlet connection E2 is then in turn connected to the outlet connection WA of the shuttle valve 50. A load-sensing port 54 of the control valve disk 6 is then connected to the first inlet connection E1 of the shuttle valve 50 and a load-sensing port 52 is connected to the first inlet connection E1 of the shuttle valve 52 of the control valve disk 8 The shuttle valves 34, 50 and 52 therefore form a shuttle valve cascade, which is designed in such a way that to the outlet connection WA of the last shuttle valve 52 of the first block part 16 in the direction of flow is connected to that load-sensing port 32 54 or 56 having the highest pressure. The inlet connection E2 of the shuttle valve 34 of the control valve disk 4 of the first block part 16 furthest from the pump is connected to an outlet port 60 by way of a plate-shaped end piece 58. The control valve disk 8, which comprises the shuttle valve 52 of the first block part 16 situated furthest downstream (or the control valve disk 8 of the first block 16 closest to the pump) is arranged adjacent to the pressure-limiting valve disk 14.

The pressure-limiting valve disk 14 comprises a pressure-limiting valve 62. This is connected to a passage 64, which in turn is connected to the outlet connection WA of the shuttle valve 52 situated furthest downstream or of the shuttle valve of the first block part 16 closest to the pump. On the outlet side the pressure-limiting valve 62 has a fluid connection to the outlet port 60. The pressure downstream of the outlet connection WA of the shuttle valve 52 is therefore limited by the pressure-limiting valve 62. Since this outlet connection WA is connected to the load-sensing port 32, 54 or 56 having the highest pressure, the pressure-limiting valve 62 serves to limit the pressure in the load-sensing port 32, 54 or 56 having the highest pressure. If the supply pressure for one of the consumers connected to the control valve disks 4, 6 or 8 exceeds the maximum pressure allowed by the pressure-limiting valve 62, this does not lead to a further rise in the pressure sensed by the load-sensing port 32, 54 or 56; instead the pressure signaled to the pressure compensator 30 of the control valve disk 4, 6 or 8 does not exceed the maximum pressure predefined by the pressure-limiting valve 62. A distorted reading of the actual load pressure is then relayed to the respective pressure compensator 30. In contrast to the prior art explained at the outset, with the valve assembly 1 according to the disclosure it is no longer necessary to provide each control valve disk 4 to 8 with a separate pressure-limiting valve, a single pressure-limiting valve 62 instead being sufficient to completely disable the volumetric flow control of the control valves 20 of the control valve disks 4, 6 or 8.

The pressure-limiting valve disk 14 separates the first block part 16 from the second block art 18, the control valve disk 10 being provided adjoining the pressure-limiting valve disk 14. A second inlet connection E2 of a control valve 66 of the control valve disk 10 is then connected to the passage 64 and therefore to the outlet connection WA of the shuttle valve 52. An outlet connection WA of the shuttle valve 66 then in turn has a fluid connection to the second inlet connection E2 of a shuttle valve 68 of the control valve disk 12. According to FIG. 2 its outlet connection WA is connected to a pressure regulator 70 of a variable-capacity pump 72. Since the shuttle valves 66 and 68 of the control valve disks 10 and 12 (close to the pump) of the second block part 18 are situated downstream of the shuttle valve 52, its load pressure registered by way of a load-sensing port 74 or 76 is not limited by the pressure-limiting valve 62. In contrast to the control valve disks 4 to 8, therefore, the level of a supply pressure for consumers connected to the control valve disks 10 or 12 is not limited.

Interchangeable mounted implements for a tractor, for example, which are to be operated at a maximum supply pressure less than a maximum system pressure, are intended as consumers which are connected to the first block part 16. Consumers fixedly arranged on the tractor, for example, such as steering, front-end loaders or other lifting gear are intended as consumers for the second block part 18. If multiple consumers are to be connected to the first block part 16, further control valve disks are simply arranged in this. If fewer consumers are provided, control valve disks are simply removed. The same applies to the second block part 18. It is also feasible to simply shift the pressure-limiting valve disk 14 and to provide this between the control valve disk 4 and 6, or 6 and 8, or 10 and 12, for example. It is also feasible to arrange the pressure-limiting valve disk 14 downstream of all control valve disks 4 to 12, there then being only one block part, in which the supply pressure for all consumers is then limited.

Figure 2:
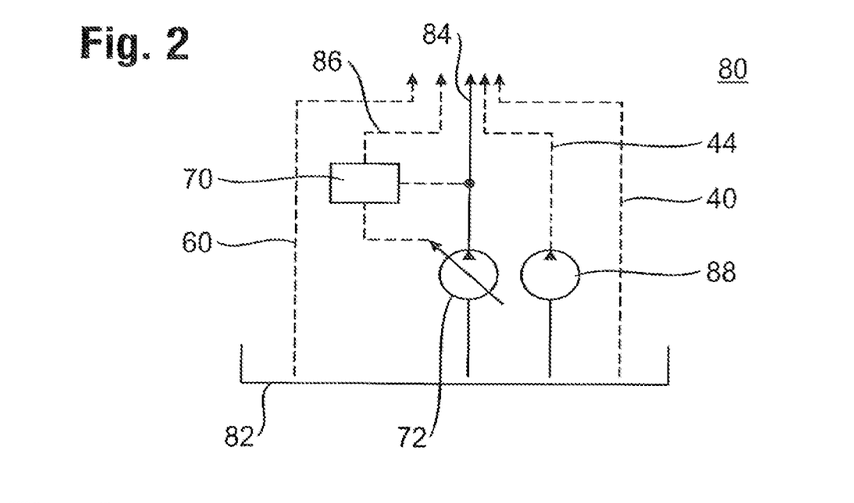

According to FIG. 1 a disk-shaped intermediate piece 78 is connected to the control valve disk 12, to which piece a pump part 80, see FIG. 2, is in turn connected, which is represented only schematically according to FIG. 2. The outlet port 60 continues in the pump part 80 and opens out in a tank 82. The tank 82 here may be situated outside the pump part 80. The variable-capacity pump 72 delivers fluid into a common inlet port 84, which extends through all control valve disks 4 to 12, through the pressure-limiting valve disk 14 and through the intermediate piece 78. In addition, a load-sensing port 86, which is connected to the pressure regulator 70 and which has a fluid connection to the outlet connection WA of the shuttle valve 68 of the control valve disk 12 situated furthest downstream (closest to the pump), is provided in the pump part 80. In addition, the pump part 80 comprises a constant-capacity pump 88, which is connected to the control fluid inlet port 44. In addition, the control fluid outlet port 40, which opens out in the tank 82, passes through the pump part 80.

Figure 3:
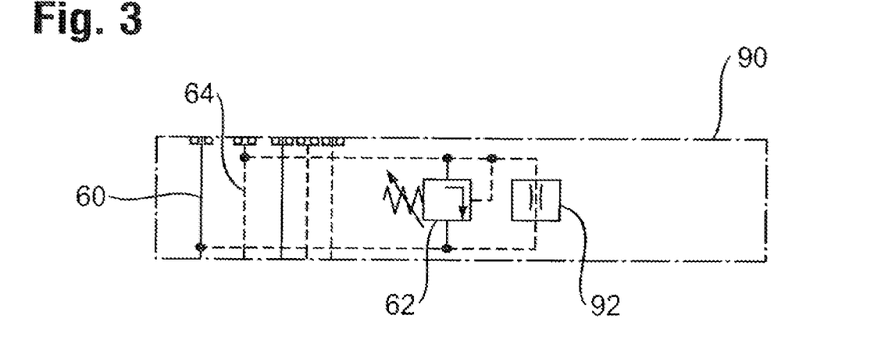

FIG. 3 represents an alternative embodiment of the valve assembly 1 in FIG. 1. In contrast to FIG. 1, a pressure-limiting valve disk 90 is provided, which has a restrictor 92 with a fluid connection parallel to the pressure-limiting valve 62. The restrictor 92 is therefore arranged between the passage 64 and the outlet port 60.

Figure 4:
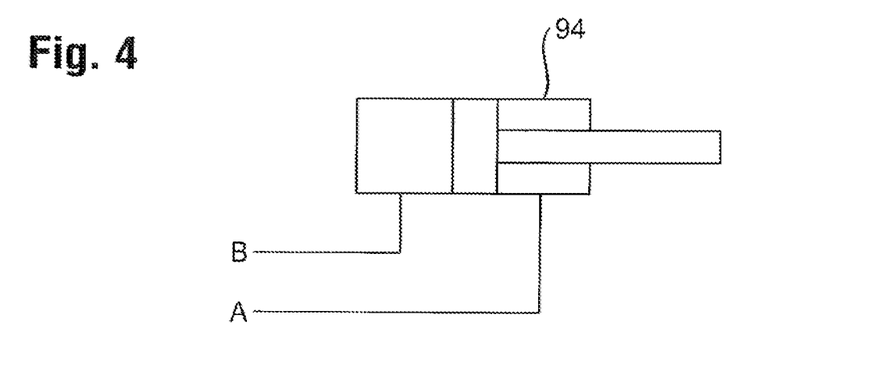
FIG. 4 shows a schematic representation of a hydraulic consumer for the valve assembly in FIG. 1

FIG. 4 represents a consumer 94 in the form of a hydraulic cylinder, by way of example. This cylinder is embodied as a differential cylinder and has working connections A and B, which serve for connecting it to the working connections A and B of the control valve disks 4 to 12.

A basic construction of the control valve disks is sufficiently known from the prior art and is explained, for example in the publication DE 10 2009 034 616 A1. For this reason, in the case of the control valve disk 98 set forth in FIG. 5 the description is confined to what is essential for the disclosure, reference otherwise being made to the prior art.

Figure 5:
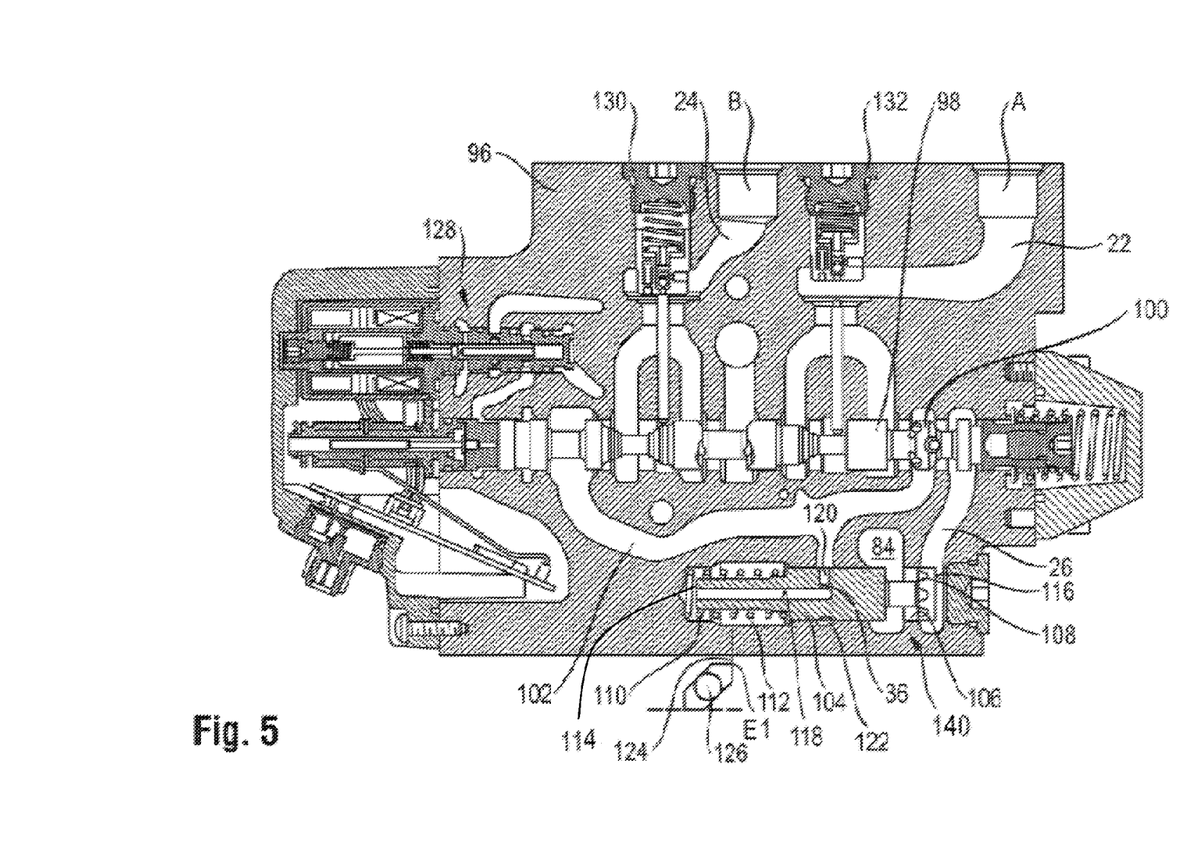
FIG. 5 shows a longitudinal section of a valve disk for the valve assembly in FIG. 1.

According to FIG. 5 a control valve disk 96 comprises a valve spool or control piston 98 having a metering orifice 100. Visible is the inlet port 84, which can be connected to the inlet port 26 by way of the pressure compensator 140. In addition, the ports 22 and 24 can be seen, with the working connections A and B. The supply pressure is registered by way of load-sensing port 102 downstream of the metering orifice 100. Here the restrictor 36 of the load-sensing port 102 is provided in a piston 104 of the pressure compensator 140. The piston 104 is guided so that it slides in a spool bore 106. The piston 104, via a control edge, 108 serves to control the fluid connection between the inlet port 84 and the inlet port 26. For this purpose the spring force of a spring 110 acts upon the piston 104 in the direction of its opening positions. This spring is arranged in a spring chamber 112, which is connected to the load-sensing port 102 by way of the restrictor 36. A first end face 114 of the piston 104 defines the spring chamber 112, so that the fluid in the spring chamber 112 acts upon this face in the opening direction of the piston 104. The fluid in the inlet port 26 in turn acts upon a second end face 116 facing away from the end face 114 in the closing direction of the piston 104. For connecting the spring chamber 112 to the load-sensing port 102, an axial blind bore, which forms a first port section, is incorporated in the piston 104 from the end face 114. Adjoining this in the base area thereof is a radial bore 120, which forms a second port section, in which the restrictor 36 is formed. The radial bore 120 opens out in a ring groove 122, which is introduced into the spool bore 106 and is connected to the load-sensing port 102. The spring chamber 112 therefore has a fluid connection to the load-sensing port 102 via the radial bore 120 and the blind bore 118. The restrictor 36 furthermore affords a damping of the piston 102 in the direction of its closing positions. Extending from the spring chamber 112 is a load-sensing port 124 for the first inlet connection E1 of a shuttle valve 126. In addition, a pilot valve 128 and non-return valves 130, 132 are provided in FIG. 5.

A valve block is disclosed, having a plurality of control valve disks, which form a first and a second block part. Here a supply pressure for the control valve disks of the first block part is limited by a common pressure-limiting valve. Here this valve is arranged in such a way that a prevailing load pressure registered by the control valve disks does not exceed a specific value. No provision is made, on the other hand, for limiting the supply pressure of the control valve disks of the second block part.

LIST OF REFERENCE NUMERALS 1 valve assembly
2 valve block
4 control valve disk
6 control valve disk
8 control valve disk
10 control valve disk
12 control valve disk
14 pressure-limiting valve disk
16 first block part
18 second block part
20 control valve
22 first port
24 second port
26 inlet port
28 outlet port
30 pressure compensator
32 load-sensing port
34 shuttle valve
36 restrictor
38 pilot valve
40 control fluid outlet port
42 metering orifice
44 control fluid inlet port
46 connection side
48 connection side
50 shuttle valve
52 shuttle valve
54 load-sensing port
56 load-sensing port
58 end piece
60 outlet port
62 pressure-limiting valve
64 passage
66 shuttle valve
68 shuttle valve
70 pressure regulator
72 variable-capacity pump
74 load-sensing port
76 load-sensing port
78 intermediate piece
80 pump pat
82 tank
84 inlet port
86 load-sensing port
88 constant-capacity pump
90 pressure-limiting valve disk
92 restrictor
94 consumer
96 control valve disk
98 control piston
100 metering orifice
102 load-sensing port
104 piston
106 spool bore
108 control edge
110 spring
112 spring chamber
114 first end face
116 second end face
118 blind bore
120 radial bore
122 ring groove
124 load-sensing port
126 shuttle valve
128 pilot valve
130 non-return valve
132 non-return valve
140 pressure compensator
A,B working connection
E1 first inlet connection
E2 second inlet connection
WA outlet connection

What is claimed is:

1. A valve assembly, comprising:
a plurality of control valves, each control valve including
a control piston configured to control a direction and speed of a respective consumer connected to the valve assembly, the control piston forming a metering orifice, and the plurality of control valves separated into a first subset of control valves and a second subset of control valves;
a respective pressure compensator assigned to each control valve such that a pressure upstream of the metering orifice and a pressure downstream of the metering orifice of each control valve is signaled to the respective pressure compensator,
each pressure compensator configured to regulate a pressure gradient at the metering orifice of the assigned control valve toward a constant value irrespective of a load of the respective consumer, and
the pressure downstream of the metering orifice of each control valve registered, in each case, to the respective pressure compensator by a respective load-sensing flow path;
a shuttle valve that includes an outlet connection, and that is configured to connect the respective load-sensing flow path of the first subset of control valves having a highest pressure to the outlet connection of the shuttle valve;
a pressure-limiting valve disposed downstream of the outlet connection of the shuttle valve, and configured to limit the highest pressure of the load-sensing flow paths of the first subset of control valves, the second subset of control valves disposed downstream of the pressure-limiting valve such that the pressure limiting valve is disposed between the first subset and the second subset; and
a restrictor disposed in a fluid connection parallel to the pressure-limiting valve.

2. The valve assembly according to claim 1, further comprising a respective restrictor configured to register the pressure downstream of the metering orifice of each control valve.

3. The valve assembly according to claim 1, wherein:
the shuttle valve includes a plurality of shuttle valve units corresponding to the control valves in the first subset of control valves, each shuttle valve unit having a first inlet connection connected to the respective load sensing path of a corresponding control valve;
the shuttle valve units are connected to each other to form a shuttle valve cascade, whereby a second inlet connection of each succeeding shuttle valve unit is connected to an outlet of a preceding shuttle valve unit; and
the outlet of the last shuttle valve unit in the shuttle valve cascade forms the outlet connection of the shuttle valve, and is configured to connect to a variable-capacity pump configured to sense the highest pressure of the load-sensing flow paths of the first subset of control valves.

4. A valve block, comprising:
a valve assembly including:
a plurality of control valve disks, a first subset of the control valve disks forming a first block part and a second subset of the control valve disks forming a second block part downstream of the first block part, each control valve disk having:
a respective control valve with a control piston configured to control a direction and speed of a respective consumer connected to the control valve disk, the control piston forming a metering orifice of the respective control valve; and
a respective pressure compensator assigned to the respective control valve such that a pressure upstream of the metering orifice and a pressure downstream of the metering orifice of the respective control valve is signaled to the respective pressure compensator,
each pressure compensator configured to regulate a pressure gradient at the metering orifice of the assigned control valve toward a constant value irrespective of a load of the respective consumer, and
the pressure downstream of the metering orifice of the respective control valve registered, in each case, to the respective pressure compensator by a respective load-sensing flow path;
a shuttle valve that includes an outlet connection, and that is configured to connect the respective load-sensing flow path of the control valve disks in the first block part having a highest pressure to the outlet connection of the shuttle valve; and
a pressure limiting valve disk positioned between the first block part and the second block part; the pressure limiting valve disk having a pressure-limiting valve disposed downstream of the outlet connection of the shuttle valve, and configured to limit the highest pressure of the load-sensing flow paths of the control disks in the first block part.

5. The valve block according to claim 4, further comprising a pump part connected to the second block part or the pressure-limiting valve disk.

6. The valve block according to claim 4, further comprising an end piece connected to the first block part.

7. The valve block according to claim 4, wherein the shuttle valve includes a plurality of shuttle valve units such that each control valve disk in the first block part includes a respective shuttle valve unit;
the respective shuttle valve unit of each control valve disk in the first block part having a first inlet connection connected to the respective load-sensing flow path of the respective control valve, a second inlet connection connected to a respective first connection side of the control valve disk, and an outlet connection connected to a second connection side of the control valve disk.

8. The valve block according to claim 7, further comprising:
a pump part connected to the second block part or the pressure-limiting valve disk;
wherein the pressure-limiting valve disk includes a passage extending between a first connection side of the pressure-limiting valve disk and a second connection side of the pressure-limiting valve disk and forming a fluid connection between (i) the outlet connection of the shuttle valve unit of an outer-most control valve disk of the control valve disks in the first block part and (ii) an adjacent control valve disk of the second block part or the pump part.

9. The valve block according to claim 4, wherein each of the control valve disks are of identical configuration.

10. The valve block according to claim 4, wherein the control valve disks and the pressure-limiting valve disk form a common inlet port, a common outlet port, a common control fluid inlet port, and a common control fluid outlet port.

11. The valve block according to claim 4, wherein each of the control valve disks includes two working connections that are connected to the respective control valve via a feed port and a return port.

12. The valve assembly of claim 4, wherein the pressure limiting valve disk further includes a restrictor disposed in a fluid connection parallel to the pressure-limiting valve.

13. The valve assembly of claim 4, wherein each control valve disk further has a respective restrictor configured to register the pressure downstream of the metering orifice of the respective control valve.

14. A valve assembly, comprising:
- a plurality of control valve disks, each control valve disk configured to connect to a respective consumer and including:
  - a control piston configured to control a direction and speed of the respective consumer;
  - a pressure compensator configured to regulate a pressure gradient for the respective consumer toward a constant value irrespective of a load of the respective consumer; and
  - a shuttle valve connected to the pressure compensator and configured such that, in a configuration whereat multiple control valve disks are positioned in a stack, the shuttle valve of a control valve disk at a bottom of the stack outputs a highest pressure of the pressure compensators of the control valve disks in the stack; and
- a pressure limiting valve disk that includes a pressure limiting valve configured such that, in a configuration whereat the pressure limiting valve disk is positioned within a stack of control valve disks, the pressure limiting valve:
  - limits a maximum pressure for the highest pressure of the pressure compensators for control valve disks positioned above the pressure limiting valve disk in the stack, and
  - does not limit pressures of pressure compensators of control valve disks positioned below the pressure limiting valve disk in the stack.

15. The valve assembly of claim 14, further comprising:
- a valve block configured to interchangeably receive the plurality of control valve disks and the pressure limiting valve disk in different stacked orders.

* * * * *

UNITED STATES PATENT AND TRADEMARK OFFICE
CERTIFICATE OF CORRECTION

PATENT NO. : 9,874,884 B2
APPLICATION NO. : 14/515099
DATED : January 23, 2018
INVENTOR(S) : Steffen Knapper It is certified that error appears in the above-identified patent and that said Letters Patent is hereby corrected as shown below:

On the Title Page

On page 2, the "OTHER PUBLICATIONS" section of the "References Cited" section (Item (56)) should read:
OTHER PUBLICATIONS
Sauer Danfoss; PVG 32 Proportional Valves; Technical Information 520L0344; Dec. 2010; 80 Pages; www.sauer-danfoss.com.
German Search Report corresponding to German Application No. 10 2013 220 750.6, mailed Jun. 11, 2014; 7 pages.

Signed and Sealed this
Third Day of April, 2018

Andrei Iancu
*Director of the United States Patent and Trademark Office*